United States Patent

[11] 3,591,891

[72] Inventor Hans Luhn
     Dresden, Germany
[21] Appl. No. 766,016
[22] Filed Sept. 23, 1968
[45] Patented July 13, 1971
[73] Assignee VEB Kombinat Fortschritt
     Dresden, Germany
[32] Priority Mar. 25, 1968
[33] Germany
[31] WP 12 g/1 31 047

[54] APPARATUS FOR THE PRODUCTION OF PRESSINGS
15 Claims, 12 Drawing Figs.

[52] U.S. Cl. .................................................. 18/12,
                                             18/30, 241/252
[51] Int. Cl. ........................................... B92f 3/02,
                                         B29f 5/00, B02c 7/10
[50] Field of Search ................................ 18/1 B, 12
     A, 12 B, 12 DM, 12 R, 12 DH, 12 SE, 12 SH, 30
     AF, DIG. 37; 241/85, 252, 220; 264/142

[56] References Cited
UNITED STATES PATENTS

| | | | |
|---|---|---|---|
| 2,037,823 | 4/1936 | Royle | 18/12 (B) UX |
| 2,059,486 | 11/1936 | Payne et al. | 18/12 (R) X |
| 2,177,132 | 10/1939 | Crabtree | 18/12 (R) X |
| 2,469,999 | 5/1949 | Stober | 18/12 (B) X |
| 2,524,751 | 10/1950 | Berger | 18/12 (A) |
| 2,543,679 | 2/1951 | Van Riper | 18/12 (B) |
| 2,910,726 | 11/1959 | Parshall et al. | 18/12 (SE) |
| 3,385,235 | 5/1968 | Rickerd et al. | 18/12 (A) X |
| 3,459,382 | 8/1969 | Renn | 241/220 X |

Primary Examiner—J. Spencer Overholser
Assistant Examiner—R. L. Spicer, Jr.
Attorney—William Anthony Drucker ABSTRACT: An apparatus for the production of pressings from bulk material in powder, piece, swarf or fiber form, in which the bulk material is fed to rotating working elements, wherein two similar disc dies (1, 2) having conical surfaces (15, 16) in the region of a ring are rotatingly mounted by means of shafts (10, 11) opposite to one another in similarly mutually opposite machine bodies (3, 4) in such manner that the axes of the shafts (10, 11) intersect at an obtuse angle, preferably greater than 150°, and the disc dies (1, 2) come into contact with one another on a common generatrix of their conical surfaces (15, 16) and roll on one another on rotation in the same direction, while a feed device (13) and a discharge device (14) are associated with the disc dies (1, 2) and the machine bodies (3, 4) are connected with one another by elements which produce a force-operated engagement.

PATENTED JUL 13 1971 3,591,891

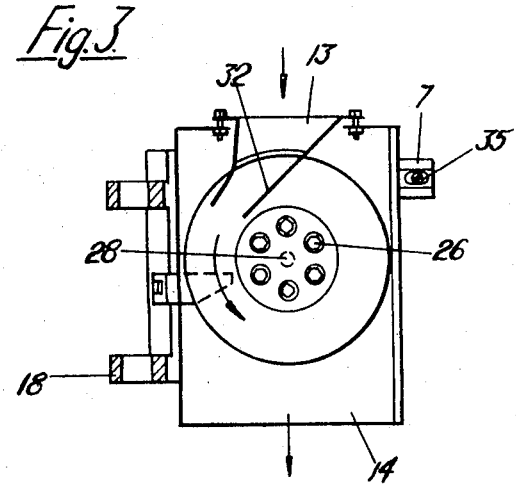
Fig. 3
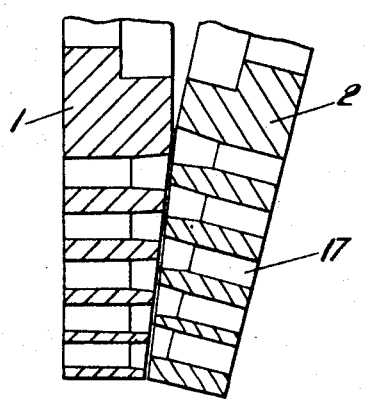
Fig. 4
Fig. 5

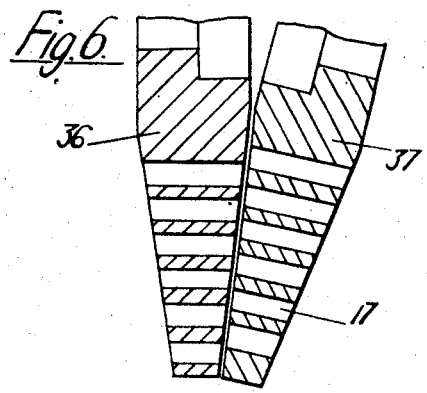
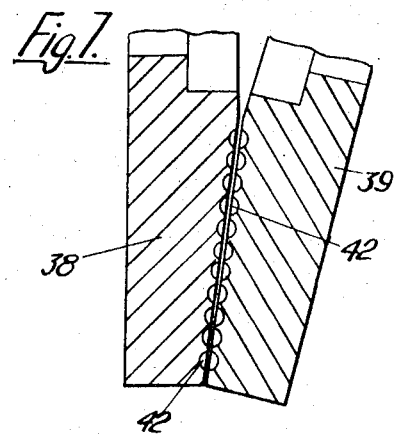
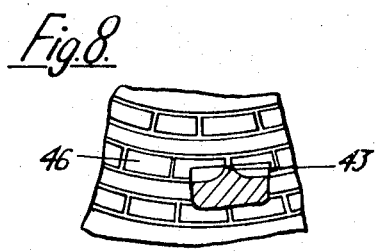
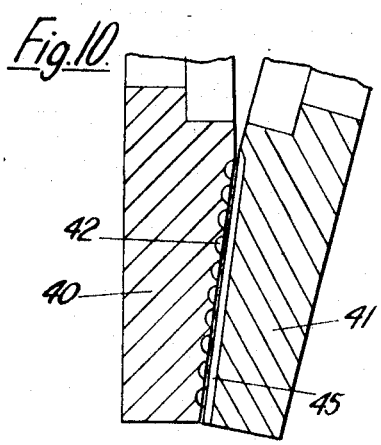
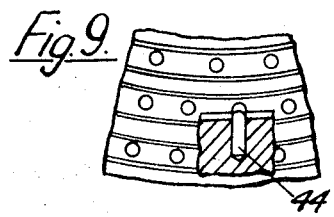
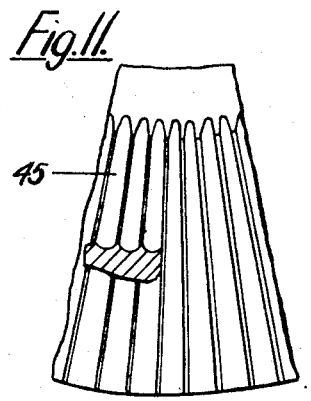
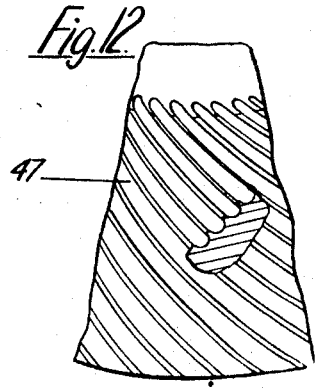

APPARATUS FOR THE PRODUCTION OF PRESSINGS

BACKGROUND OF THE INVENTION

The invention relates to an apparatus for the production of pressings from bulk material in powder, piece, swarf or fiber form, in which the bulk material is fed to rotating working elements.

Apparatuses are known in which the bulk material for the production of hard pressings is fed to the center of a vertically arranged rotating ring die, which possesses a plurality of press bores distributed over its periphery, which extend radially through the die wall, and is forced through the press bores by a plurality of press rolls arranged in the press chamber of the ring die. While the ring die is driven, the press rolls are set in rotation by the friction forces caused by the pressing force. In another embodiment the press rolls are driven, while the ring die runs with its inner cylindrical surface freely on the press rolls.

In presses with horizontally mounted die made in disc form, with press bores arranged in distribution over a ring and conducted through the die wall, the press rolls work in the same manner as in the edge mill usual in the grinding technique. It is known here that either the die or the press rolls or both elements are driven. The embodiments as described possess disadvantages which consist in that the production of the ring die is relatively expensive and the uniform distribution of the material among the press rolls causes difficulties, and that in the case of the edge mill principle considerable sliding movements occur between the press roll and the die, which in view of the great pressures lead to heavy friction and thus increased power demands and to greater wear upon die and press rolls. The voluminous construction, expensive as regards mass and costs, and the necessity of a reduction of the rotation speed of the drive motor in every known press are regarded as further disadvantages.

The common principle of the apparatuses considered above is the uniform rotational movement of two rotational or rolling bodies which come into contact with one another on a generatrix of their curved surfaces through a thin intermediate layer of the pressed material and roll on one another. One of the mutually opposite surfaces is here always provided with piercings. In another known embodiment two cylinders of equal size associated with one another are driven in mutually opposite directions of rotation with equal rotation speed through a gearing. The cylinder surfaces have depressions distributed on their periphery which serve to receive, mold and press the pressed material fed from above between them. The disadvantage of these presses consist in that a toothed wheel gearing is necessary which in combination with the necessarily sturdy formation of the working elements and their mountings necessitates a high expense for bulk and costs.

SUMMARY OF THE INVENTION

It is the purpose of the invention to modify the known press system in order to achieve favorable pressing conditions with smaller die dimensions and to adapt the conditions in the press region largely to the requirements in each case by exchange of the working elements. The problem of the invention consists in providing an apparatus in which by simply designed interchangeable working elements with minimum possible dimensions, a long, wedge-shaped press zone with smallest possible angle is produced and thus favorable conditions are achieved for the application of a high rotation speed of the working elements.

According to the present invention this is achieved by an apparatus for the production of pressings from bulk material including two mutually opposite machine bodies, a hinge member for pivotally interconnecting the bodies, a shaft rotatably mounted in each of the said bodies such that the axes of said shafts intersect at an obtuse angle, a motor coupled to at least one of said shafts for driving said shafts, two frustoconical disc dies mounted on opposed ends of the shafts, the disc dies each having piercings or grooves formed in the conical surface thereof, interconnectable feed and discharge devices for feeding material to be pressed between the disc dies and for discharging the pressings from the apparatus and disengageable clamping means for interconnecting the two body parts for maintaining the disc dies in working relationship, whereby the disc dies come into contact with one another on a common generatrix of their frustoconical surfaces and whereby material fed through the feed device passes between said conical surfaces or the disc dies to be pressed into the piercings or grooves whereby upon release therefrom the pressings emit from the discharge device.

A further feature of the invention consists in that the disc dies for the shaping of pressings are provided with cavities which are piercings or depressions made in any form or with radial or concentric grooves. In the case of disc dies with piercings it is provided that the piercings lie on circles the intervals of which constantly reduce in the radial direction towards the outer radius, the intervals of the piercings in the peripheral direction decreasing uniformly from circle to circle towards the exterior and the piercings of the one disc die being offset in relation to those of the other in the radial direction by half the amount of their intervals. It is further provided that the disc dies are detachably secured on the shaft ends carrying them and that they are centered by means of guide pegs arranged on the shaft ends. A further feature of the invention consists in that the mutually opposite machine bodies are provided on one side, preferably a vertical side, with hinge parts and are connected with one another by a hinge bolt, and in that a clamping element of adjustable length inserted into retaining parts on the opposite side of the machine bodies effects the force-operated engagement between the disc dies, an overload safety device being interposed.

The invention further provides that more advantageously only one disc die is driven, the shaft end of the shaft carrying the driven disc die being formed as a sleeve for the reception of the shaft stub pertaining to a drive motor, and that the machine body carrying the drive shaft is arranged in common with the drive motor on a base frame.

In comparison with known apparatuses, with smaller dimensions of the disc dies, larger curvatures of the surfaces rolling on one another are achieved, so that in combination with the die piercings which come into action on both sides in the pressing zone a substantial increase of the rolling speed is achieved in the pressing region with a specific displacement speed necessary to achieve the pressure. Due to the possible increase of the rolling speed and the reduction of the diameter of the disc dies a substantial increase is achieved in the drive rotation speed and a direct drive is rendered possible. This results advantageously in an extensive reduction of the constructional dimensions of the entire apparatus and a reduction of the costs. The production of pressings of smaller dimensions becomes especially economical by the use of disc dies provided with grooves or depressions.

BRIEF DESCRIPTION OF THE DRAWINGS

The apparatus according to the invention and further details, especially regarding the construction of the disc dies, are to be explained hereinafter by reference to an example of embodiment in connection with the accompanying drawings, wherein:

FIG. 3 shows a vertical section along the line B—B in FIG. 2,

FIG. 4 shows a part of the disc dies contained in FIG. 2, represented as detail, FIG. 5 shows a part of the view of one of the disc dies according to FIG. 4, FIG. 6 shows a part of disc dies of another form of embodiment, represented as detail, FIGS. 7 and 10 show a part each, represented as detail, of disc dies according to FIG. 2 with groove arrangement, FIGS. 8 and 9 show details of the views of disc dies with forms of embodiment of interrupted grooves according to FIG. 7, FIGS. 11 and 12 show details of the views of disc dies with groove arrangement according to FIG. 10.

DESCRIPTION OF THE PREFERRED EMBODIMENTS

Figure 1:
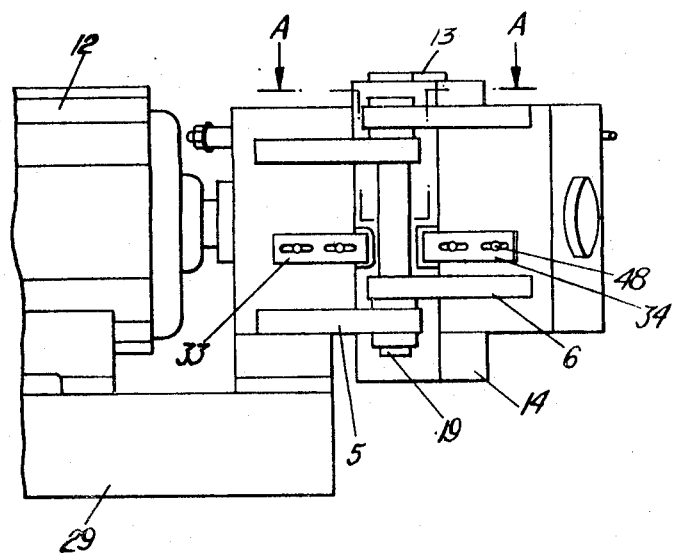
FIG. 1 shows an elevation of the apparatus according to the invention.
Figure 2:
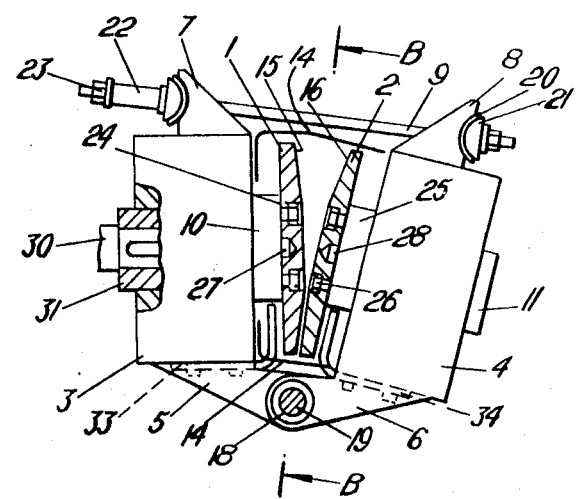
FIG. 2 shows a plan view, partially in section, along the line A—A in FIG. 1.

According to FIGS. 1 and 2 the apparatus consists essentially of the disc dies 1, 2, the machine bodies 3, 4 with hinge parts 5, 6 retaining parts 7, 8 with clamping element 9, the shafts 10, 11 the drive motor 12, the feed device 13 and discharge device 14.

Two similar disc dies 1, 2, which possess conical surfaces 15, 16 with piercings 17 in a ring, are mounted opposite to one another by means of shafts 10, 11 in similarly mutually opposite machine bodies 3, 4 in such a way that the axes of the shafts 10, 11 intersect one another at an obtuse angle, preferably greater than 150°. The disc dies 1, 2 are in contact with one another on a common generatrix of their conical surfaces 15, 16 directly or through a thin layer of pressed material, and roll on one another with rotation in the same direction.

The connection of the mutually opposite machine bodies 3, 4 is achieved by the arrangement on one common, preferably vertical side of hinge parts 5, 6 each with a bore 18 which receive a hinge bolt 19. On the side opposite to the articulated connection, retaining parts 7, 8 are provided which possess a cylindrical socket 20 and a bore 35 each, in which a clamping element 9 is mounted on angularly movable cylindrical supports 21.

The clamping element 9 is loaded by a component of the press force occuring between the disc dies 1, 2 and is equipped with an overload safety device 22, preferably plastically or elastically deformable, to protect the entire apparatus against overloading, the adjustment of an initial tension or of an intentional small distance between the disc dies 1, 2 being effected by means of nuts 23. The disc dies 1, 2 are detachably secured each on a shaft end 24, 25 by means of fitted screws 26 arranged in countersunk fashion; the centering of the disc dies 1, 2 is here effected by the guide pegs 27 provided on the shaft ends 24, 25 and bores 28 arranged in the disc dies. The drive motor 12, which is arranged in common with the machine body 3 on a base frame 29, engages with its shaft stub 30 in the shaft end 31 formed as sleeve and thus transmits the torque to the disc die 1. The material to be pressed is fed preferably from above by way of the feed device 13 to the disc dies 1, 2 and forced through the piercings 17 of the two disc dies 1, 2 according to FIGS. 4 and 5, the outlet 32 of the feed device 13 being conducted tangentially between the disc dies 1, 2 as far as the conical surfaces 15, 16. The pressings are broken away at a predetermined length by the expellers 33, 34 adjustably secured with screws 48 on the machine bodies 3, 4. The pressings are caught in a discharge device 14 arranged between the machine bodies 3, 4 and discharged downwards by free dropping or by ejection. The discharge device 14 is preferably formed as a housing which completely encloses the rotating disc dies 1, 2 situated between the machine bodies and permits the securing of the interchangeable feed device 13 which may be detachably connected to the discharge device 14 in any known manner, i.e. by nuts and bolts. According to FIG. 3 the disc dies 1, 2 are secured by means of the fitted screws 26 on the shaft ends 24, 25. By removal of the clamping element 9 it becomes possible to pivot the machine body 4 aside, to disengage the fitted screws 26 and to interchange the disc dies 1, 2, 36 to 41. The piercings 17 of the disc dies 1, 2 are arranged according to FIGS. 4 and 5 preferably on circles the intervals of which constantly reduce in the radial direction towards the outer radius, while at the same time the intervals of the piercings 17 in the peripheral direction decrease from circle to circle radially outwards. Thus an adequately uniform firmness of the pressings is achieved over the whole radially extending region of the pressing zone. This is based on the fact that the occurring pressure is dependent upon the speed of displacement of the pressed material and this also decreases as a result of the decreasing rolling speed from the external diameter to the center.

Due to the wide arrangement of the piercings 17 in the inner region moreover the strength of the disc dies 1, 2 is increased. The form of embodiment of the disc dies 36, 37 according to FIG. 6, which provides that the rear surfaces in the region of the piercings 17 are bevelled away conically towards the external radius so that the length of the piercings 17 effectively reduces towards the external radius, serves for the same purpose, the uniform pressing firmness. This form of embodiment permits an arrangement of the piercings 17 in regular spacing, even in the closest arrangement sequence. It is also possible to make one in each case of the disc dies used in pairs as a flat disc. The versatile use of the apparatus according to the invention appears from FIGS. 7 to 12. In FIG. 7 similarly designed disc dies 38, 39 with grooves 42 are represented. This form of embodiment renders possible the production of pressings of small dimensions. The pressing lengths then produced break apart due to centrifugal force and impact effect on emergence from the pressing zone. The expellers 33, 34 do not come into action in this case. As shown by FIGS. 8 and 9 it is also provided that the grooves 42 of the disc dies 38, 39 are interrupted by webs 43 left standing in the machining or subsequently inserted pins 44. The grooves 46 are provided with interruptions whereby interrupted grooves are arranged so that on pairing of the disc dies they stand alternately opposite in each case to uninterrupted grooves of the disc dies 38, 39. FIGS. 10 to 12 show forms of embodiment of disc dies which are advantageous especially for the production of very small pressings. The disc die 41 is provided with radially extending grooves 45, while the disc die 40 comprises concentrically extending grooves 42. By the pairing of the disc dies 40, 41 according to FIGS. 10 and 11 a latticework of half-round profiles crossing at right angles is produced, which breaks into cruciform parts after pressing. The same aim is achieved by the pairing of two disc dies according to FIG. 12. The disc dies 40, 41 are provided with spiral grooves 47 extending at a pitch angle of 45°. Two such discs may be paired with one another. While the grooves in the disc dies may have any suitable cross sections, the grooves preferably have a semicircular cross section.

I claim:

1. An apparatus for the production of pressings from bulk material including two mutually opposite machine bodies, a hinge member for pivotally interconnecting the bodies, a shaft rotatably mounted in each of the said bodies such that the axes of said shafts intersect at an obtuse angle, a motor coupled to at least one of said shafts for driving said shafts, two frustoconical disc dies mounted on opposed ends of the shafts, the disc dies each having cavities formed in the conical surface thereof, interconnectable feed and discharge devices for feeding material to be pressed between the disc dies and for discharging the pressings from the apparatus and disengageable clamping means for interconnecting the two body parts for maintaining the disc dies in working relationship, whereby the disc dies come into contact with one another on a common generatrix of their frustoconical surfaces and whereby material fed through the feed device passes between said conical surfaces of the disc dies to be pressed into the cavities whereby upon release therefrom the pressings emit from the discharge device.

2. The apparatus according to claim 1, wherein the discharge device extends over the whole width and length of the free space between the machine bodies to effect covering of the rotating disc dies, the discharge device being connected with one of the two machine bodies and the feed device being detachably connected with the discharge device thereby to feed material to be pressed tangentially between the disc dies.

3. The apparatus according to claim 1, wherein the piercings of the one disc die are offset in relation to those of the other by half the amount of their intervals of the division existing in the radial direction, so that the piercings and the remaining surface parts lie alternately opposite to one another.

4. The apparatus according to claim 1, wherein the piercings of the disc dies lie on circles the intervals of which constantly reduce in the radial direction towards the external radius and the intervals of the piercings in the peripheral direction decrease from circle to circle in the outward direction.

5. The apparatus according to claim 4, wherein the disc dies are bevelled off on their rear surfaces in the region of the piercings towards the outer radius.

6. The apparatus according to claim 1, wherein the disc dies are provided with concentrically arranged grooves, for the shaping of pressings, which grooves stand opposite to one another on pairing of the disc dies.

7. The apparatus according to claim 6, wherein the concentrically arranged grooves possess interruptions by webs or pins.

8. The apparatus according to claim 1, wherein the disc die is provided with concentrically extending grooves and the disc die possesses radially extending grooves.

9. The apparatus according to claim 1, wherein the disc dies are provided with spiral grooves extending at a pitch angle of 45°.

10. The apparatus according to claim 1, wherein the hinge member comprises hinge parts each having a bore for the reception of a hinge bolt, which are arranged on one common, preferably vertical side of the mutually opposite machine bodies.

11. The apparatus according to claim 1, wherein hinge parts each having a bore for the reception of a hinge bolt are arranged on one common, preferably vertical side of the mutually opposite machine bodies.

12. The apparatus according to claim 11, wherein on the side of the machine bodies opposite to the articulated connection a retaining part in each case is provided, in which a clamping element effects the force-operated engagement between the disc dies.

13. The apparatus according to claim 1, characterized in that preferably in each case only one of the disc dies used by pairs is connected with a drive motor.

14. The apparatus according to claim 1, wherein the shaft connected with the drive motor is formed as drive shaft, the shaft end of the drive shaft being formed as sleeve for the reception of the shaft stub pertaining to the drive motor.

15. The apparatus according to claim 1, wherein the machine body carrying the drive shaft is arranged in common with the drive motor on a basic frame.